(12) United States Patent
Silva

(10) Patent No.: US 12,525,797 B2
(45) Date of Patent: Jan. 13, 2026

(54) SYSTEMS AND METHODS FOR ELECTRICAL POWER DELIVERY WITH FAULT MANAGEMENT

(71) Applicant: AcLeap Power Inc., Taipei (TW)

(72) Inventor: Arturo Silva, Allen, TX (US)

(73) Assignee: ACLEAP POWER INC., Taipei (TW)

( * ) Notice: Subject to any disclaimer, the term of this patent is extended or adjusted under 35 U.S.C. 154(b) by 211 days.

(21) Appl. No.: 18/470,130

(22) Filed: Sep. 19, 2023

(65) Prior Publication Data
US 2025/0096561 A1    Mar. 20, 2025

(51) Int. Cl.
*H02J 3/00* (2006.01)

(52) U.S. Cl.
CPC ......... *H02J 3/0012* (2020.01); *H02J 2203/10* (2020.01)

(58) Field of Classification Search
CPC ............................ H02J 3/0012; H02J 2203/10
USPC ......................................................... 361/62
See application file for complete search history.

(56) References Cited

U.S. PATENT DOCUMENTS

| | | | | |
|---|---|---|---|---|
| 10,714,930 B1* | 7/2020 | Weiss | ...................... | H02H 7/265 |
| 2012/0075759 A1* | 3/2012 | Eaves | ...................... | H02H 3/44 |
| | | | | 361/86 |
| 2013/0103220 A1* | 4/2013 | Eaves | ...................... | H02H 7/261 |
| | | | | 700/293 |
| 2015/0215001 A1* | 7/2015 | Eaves | ................... | H04L 1/0033 |
| | | | | 375/257 |
| 2017/0207622 A1* | 7/2017 | Jouper | ...................... | H02H 3/10 |
| 2018/0313886 A1* | 11/2018 | Mlyniec | ................ | G01R 31/088 |
| 2020/0366079 A1 | 11/2020 | Telefus et al. | | |
| 2025/0147091 A1 | 5/2025 | Silva | | |

* cited by examiner

*Primary Examiner* — Sreeya Sreevatsa
(74) *Attorney, Agent, or Firm* — McCarter & English, LLP; Michael M. Gnibus

(57) ABSTRACT

A fault-managed power delivery system for delivery power across a distance is provided. The system includes a transmitter-side subsystem and a receiver-side subsystem. The system further includes a fault management circuitry that includes a reference resistor having a known resistance and a controller. The controller is configured to electrically connect the reference resistor between a line conductor of a line and a neutral conductor and disconnect the output power to the load during a fault-detection portion of a duty cycle of power delivered to the receiver-side subsystem. The controller is further configured to determine an impedance of the power delivery system during the fault-detection portion, determine a fault condition based on the impedance, and disconnect the line if the fault condition is detected. The fault management circuitry is positioned in the transmitter-side subsystem and/or the receiver-side subsystem.

20 Claims, 4 Drawing Sheets

SYSTEMS AND METHODS FOR ELECTRICAL POWER DELIVERY WITH FAULT MANAGEMENT

BACKGROUND

The field of the disclosure relates generally to electrical power systems, and more particularly, to systems and methods for electrical power delivery with fault management.

Utility supplies electrical power to a load at a premise such as an industrial site via a power delivery system including hot lines and a neutral conductor. Fault conditions and/or hazardous conditions may occur in and/or among hot lines, neutral conductors, and/or the load, presenting as risks to an installer, a user, or the facility. Known methods and assemblies are disadvantaged in some aspects and improvements are desired.

BRIEF DESCRIPTION

In one aspect, a fault-managed power delivery system for delivering power across a distance with fault management is provided. The system includes a transmitter-side subsystem configured to receive power from power mains and configured to convert the power to a direct current (DC) power. The system also includes a receiver-side subsystem electrically connected with the transmitter-side subsystem via a transmission line and configured to convert the DC power to an output power and deliver the output power to a load. The system further includes a fault management circuitry. The fault management circuitry includes a reference resistor having a known resistance and a controller. The controller is configured to electrically connect the reference resistor between a line conductor of a line and a neutral conductor and disconnect the load during a fault-detection portion of a duty cycle of power delivered to the receiver-side subsystem. The controller is further configured to determine an impedance of the power delivery system during the fault-detection portion, determine a fault condition based on the impedance, and disconnect the line if the fault condition is detected. The fault management circuitry is positioned in the transmitter-side subsystem and/or the receiver-side subsystem.

In another aspect, a method for delivering power across a distance with fault management is provided. The method includes providing a transmitter-side subsystem configured to receive power from power mains and configured to convert the power to a DC power and a receiver-side subsystem configured to convert the DC power to an output power and deliver the output power to a load. The method also includes electrically connecting the transmitter-side subsystem with the receiver-side subsystem via a transmission line, and positioning a fault management circuitry in the transmitter-side subsystem and/or the receiver-side subsystem. The fault management circuitry includes a reference resistor having a known resistance. The method further includes during a fault-detection portion of a duty cycle of power delivered to the receiver-side subsystem, electrically connecting the reference resistor between a line conductor of a line and a neutral conductor, and disconnecting the load. The method also includes determining an impedance during the fault-detection portion, determining a fault condition based on the impedance, and disconnecting the line if the fault condition is detected.

In one more aspect, a fault management circuitry for managing faults in a power delivery system of delivering power across a distance is provided. The fault management circuitry includes a reference resistor having a known resistance, and a controller. The controller is configured to electrically connect the reference resistor between a line conductor of a line and a neutral conductor and disconnect a load during a fault-detection portion of a duty cycle of DC power delivered across a distance. The controller is further configured to determine an impedance of a power delivery system during the fault-detection portion, determine a fault condition based on the impedance, and disconnect the line if the fault condition is detected.

DRAWINGS

These and other features, aspects, and advantages of the present disclosure will become better understood when the following detailed description is read with reference to the accompanying drawings in which like characters represent like parts throughout the drawings.

DETAILED DESCRIPTION

The disclosure includes systems and methods for power delivery with fault management. Method aspects will be in part apparent and in part explicitly discussed in the following description.

Known power delivery systems include some fault protection such as ground fault or arc protections, using devices such as breakers or fuses. The system, however, does not limit or monitor the power delivery. The power continues to be delivered until the breakers or fuses disconnect the circuit. By that time, the person may have already suffered from electrical shock or the load may have already been damaged, due to the fault. In some known systems, a capacitor is used to detect whether a person is connected in some part of the power system based on the discharging rate of the capacitor. Due to the indirect relationship between the discharging rate and the presence of a human body in the power delivery system, improvement in the reliability of detection is desired.

In contrast, systems and methods described herein monitors the power system for fault conditions and disengage power delivery upon the detection of fault conditions, thereby increasing the safety protection of the power delivery system for users, installers, and the load(s). Further, systems and methods described herein detect the presence of a human body in the power delivery cables based on the impedance of the human body and the direct relationship between the changes in the impedance of the power delivery system and the presence of a human body in the power delivery system, thereby increasing the reliability of detection of fault conditions. Because of the safeguards placed in the systems and methods described herein, the installation of the systems does not require a certified electrician, thereby reducing the costs associated with installation. Systems and methods described herein provide detection and protection against a gamut of safety hazards, including a line-to-ground fault, a line-to-line fault, a line-to-line resistive fire hazard, and a series resistive fire hazard, arcs, and overcurrent, using one single system, unlike in known systems, where separate devices are needed to provide protection against each specific fault or hazardous condition. Accordingly, systems and methods described herein save costs associated with the additional devices.

Figure 1A:
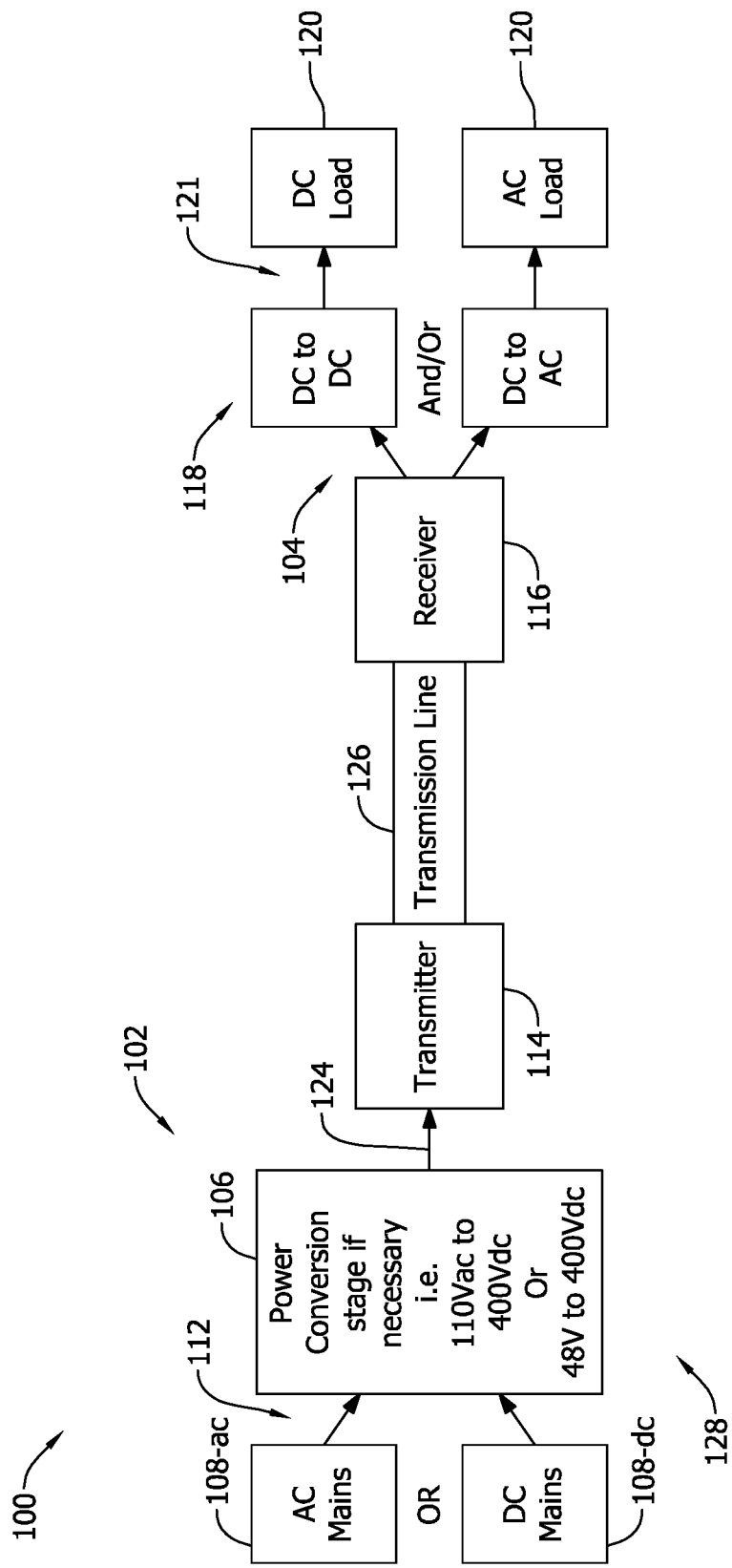
FIG. 1A is a schematic diagram of an example power delivery system.
Figure 1B:
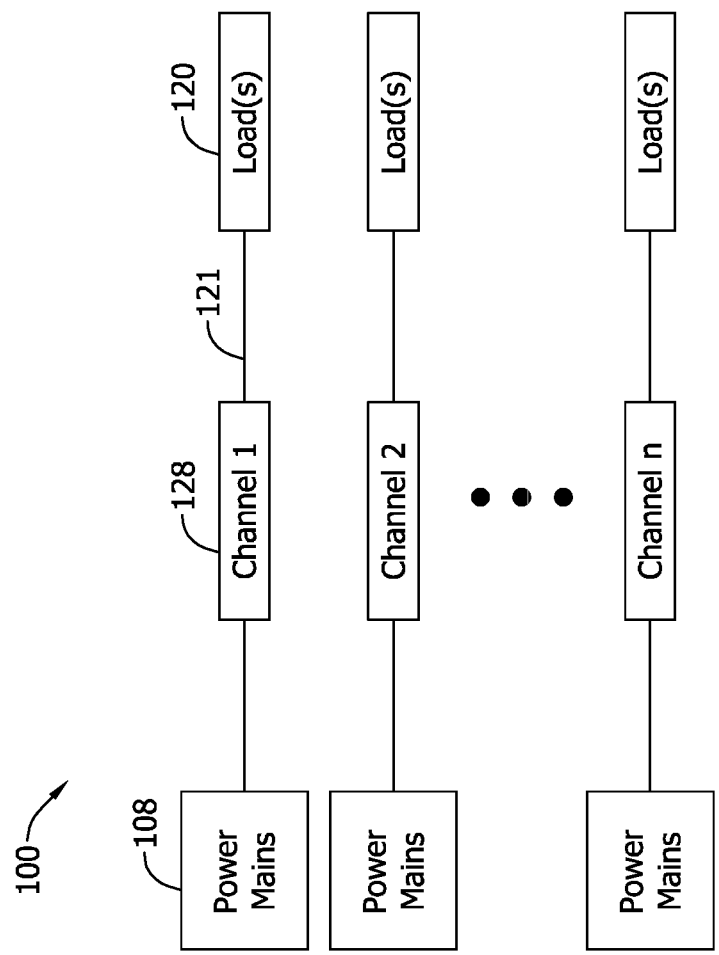
FIG. 1B is a schematic diagram of another example power delivery system having multiple channels.

FIGS. 1A and 1B are schematic diagrams of an example fault-managed power delivery system 100. In the example embodiment, system 100 includes a transmitter-side subsystem 102. Transmitter-side subsystem 102 is configured to receive power from power mains 108. Power mains 108 may be alternate current (AC) mains 108-*ac* and/or direct current (DC) mains 108-*dc*. Input power 112 may be DC, AC, or a combination of DC and AC. Transmitter-side subsystem 102 may include a transmitter-side power conversion stage 106. Transmitter-side power conversion stage 106 is configured to convert electrical power received from power mains 108 to a DC power 124. An example voltage of DC power 124 is 400 Vdc. DC power 124 may be at other voltages, such as a voltage between 48 Volt (V) to 450 V. Transmitter-side subsystem 102 includes a transmitter 114. Transmitter 114 is a processor-controlled device that controls the power delivery, monitors for fault conditions, and is configured to terminate the power transmission in the event of a fault condition for enhanced user and installer safety.

In the example embodiment, system 100 includes a receiver-side subsystem 104. Receiver-side subsystem 104 includes a receiver 116. Receiver 116 is a processor-controlled device configured to monitor the power delivery, monitor for fault conditions, and disconnect the load(s) in the event of a fault condition. Receiver-side subsystem 104 may further include a receiver-side power conversion stage 118. Receiver-side power conversion stage 118 is configured to condition output power 121 that meets the requirements of load(s) 120. Receiver-side power conversion stage 118 may be a down or up AC or DC power converter based on load requirements. Load 120 may be a single or multiple loads. The requirements of separate loads 120 may be different.

In operation, transmitter-side power conversion stage 106 is connected to power mains 108. Input power 112 from power mains 108 is converted to DC power 124 at a pre-selected voltage. DC power 124 is delivered across a distance to receiver-side subsystem 104 via transmission line 126. The delivery to receiver-side subsystem 104 is monitored and controlled by transmitter 114. On the receiver side, DC power 124 is converted to a power that meets the requirements of load(s) 120. The delivery of power to load(s) 120 is controlled and monitored by receiver 116. Transmitter 114 and receiver 116 are positioned at either end of transmission line 126. Transmitter 114 and receiver 116 monitor the power delivery and for fault conditions and are configured to terminate power delivery upon detection of fault conditions. As used herein, a fault condition is a condition that poses safety risks to a user, an installer, a load, and/or the power delivery system. A fault condition may include a line-to-ground fault, a line-to-line fault, a line-to-line resistive fire hazard, a series resistive fire hazard, overcurrent, arcs, and any combination thereof.

Using DC power in system 100 is advantageous in reducing the demand on the computation power and memory of a controller 202 (see FIG. 2 described later) of transmitter 114 or receiver 116 because calculation of DC power is relatively simple and demands relatively little computation power and memory once the current is determined or sensed because the voltage is constant.

Because the voltage in system 100 is limited to 450 V or less, transmission line 126 may not be needed to be housed in a conduit, unlike known power delivery systems. Power delivery without conduits reduces costs associated with conduits and installation and assembling of conduit assemblies. To limit power loss from the electrical resistance of transmission line 126, the length of transmission line 126 is a few kilometers, such as 2 km, or less. The length limit depends on the resistance of the transmission line, which depends on factors such as the gauge of the conductor of the transmission line. A conductor of a relatively smaller gauge has a relatively greater diameter and thickness, a relatively smaller resistance, and therefore a relatively longer length limit for the transmission line.

In FIG. 1A, system 100 is depicted as a system having one single channel 128 for delivering power at a certain rated power. To increase the power that can be delivered, multiple channels 128 may be used (see FIG. 1B). For example, if a single channel 128 of system 100 is rated at 2 kw, to be able to deliver 20 kw of power, 10 channels are included and the rated output power of system 100 is increased to 20 kw. In some embodiments, the plurality of channels 128 are electrically connected in parallel with one another and include port(s) to receive power from power mains 108 and port(s) to deliver power to load(s). The number of channels is determined based on the maximum transmitter power and the load power requirements.

Figure 2:
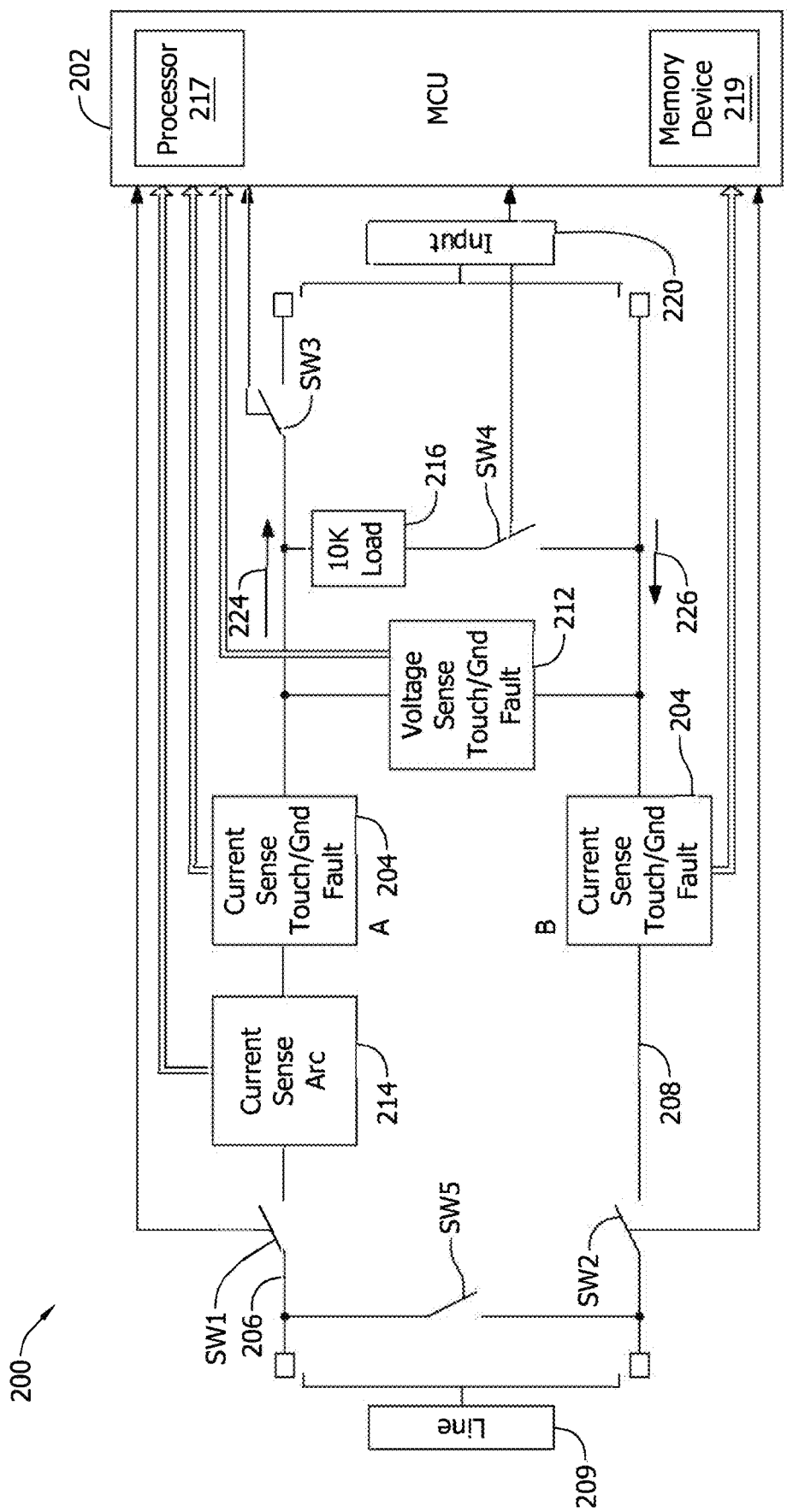
FIG. 2 is a schematic circuit diagram of an example fault management circuitry of the power delivery system shown in FIGS. 1A and 1B.

FIG. 2 is a schematic diagram of a fault management circuitry 200. In the example embodiment, fault management circuitry 200 includes current sensors 204. Current flows into line conductor 206 of a line 209 and returns via neutral conductor 208. Current sensor 204 may be electrically connected to a line conductor 206 of line 209 and configured to measure line current 224 flowing into line conductor 206. Neutral conductor 208 may include a current sensor 204 configured to measure return current 226 returns to neutral conductor 208. The directions of currents 224, 226 are depicted as an example for illustration purposes only. Currents 224, 226 may flow in directions opposite from the depicted directions. Current sensors 204 may be resistor-based or shunt-based current sensors. Fault management circuitry 200 may further include a voltage sensor 212 configured to measure a voltage difference between line conductor 206 and neutral conductor 208. For example, voltage sensor 212 is electrically connected to both line conductor 206 and neutral conductor 208 and configured to sense a voltage between line conductor 206 and neutral conductor 208.

In the example embodiment, fault management circuitry 200 further includes switches SW1 and SW2. Switch SW1 is positioned in line conductor 206. Switch SW2 is positioned in neutral conductor 208. Switches SW1 and SW2 are configured to connect or disconnect line conductor 206 by opening or closing SW1, SW2. For example, line conductor 206 is connected to or disconnected from power supply when switch SW1 is closed or opened. Neutral conductor 208 is connected to or disconnected from power supply when switch SW2 is closed or opened. In some embodiments, fault management circuitry 200 further includes a line discharge switch SW5. Line discharge switch SW5 is electrically connected between line conductor 206 and neutral conductor 208. Switch SW5 is used to discharge charges remained in line conductor 206 due to the capacitance of line conductor 206 after power is disconnected from line conductor 206, thereby reducing risks from the remaining charges. Switch SW5 is positioned upstream of switches SW1 and SW2.

In the example embodiment, fault management circuitry 200 further includes an arc sensor 214. In some embodiments, arc sensor 214 and current sensor 204-A may be in one device, where the device is configured to sense current and/or detect arcs in a line conductor 206. Arc sensor 214 may include a current transformer to sense the current flowing through line conductor 206. Arc sensor 214 is configured to detect arcs in line conductor 206. Arc sensor 214 includes a filter configured to output high-frequency noise in the current flowing through line conductor 206. The high-frequency noise filtered out by arc sensor 214 is sent to controller 202 and compared with known noise signatures. Load 120 such as a motor may be noisy and has a noise signature. High-frequency noise is compared with the known noise signatures. If high-frequency noise is different from known noise signatures, for example the high-frequency noise having a different frequency spectrum from the known noise, arcs in line conductor 206 are detected.

In the example embodiment, fault management circuitry 200 includes a reference resistor 216 having a known electrical resistance. For example, reference resistor 216 has a resistance of 10 kiloohms (kΩ). Reference resistor 216 is used to measure impedance of system 100. The resistance of reference resistor 216 is selected such that the current flowing through reference resistor 216 is above a level detectable by an analog-to-digital (ADC) converter and is below a level that does not cause damage to the ADC and reference resistor 216. The ADC may be included in a controller 202 and/or sensors 204, 212, or 214, or separately provided. Reference resistor 216 is electrically connected with resistor switch SW4. Closing and opening of resistor switch SW4 connects reference resistor 216 to or disconnects reference resistor 216 from power supply. Reference resistor 216 is connected between line conductor 206 and neutral conductor 208. Fault management circuitry 200 further includes a switch SW3. Closing and opening of switch SW3 controls the manner in which power in system 100 is delivered. When SW3 is closed, power is delivered to load 120. When SW3 is open, load 120 is disconnected and reference resistor 216 is connected between line conductor 206 and neutral conductor 208, facilitating detection of fault conditions.

In the example embodiment, fault management circuitry 200 includes a controller 202. Controller 202 may be included in transmitter 114 and/or receiver 116. Controller 202 includes a processor-based microcontroller including a processor 217 and a memory device 219 wherein executable instructions, commands, and control algorithms, as well as data and information needed to satisfactorily operate controller 202, are stored. The memory device 219 may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set circuits (RISC), application specific integrated circuits (ASIC), field programmable gate array (FPGA), and other programmable circuits, logic circuits, equivalents thereof, and any other circuit or processor capable of executing the functions described below. The processor-based devices listed above are examples only, and are thus not intended to limit in any way the definition and/or meaning of the term "processor-based."

In the example embodiment, controller 202 is electrically connected with switches SW1-SW5 and configured to control the closing and opening of switches SW1-SW5. Switches SW1-SW5 are individually controlled by controller 202. Data collected from current sensors 204, voltage sensor 212, and arc sensor 214 are sent to controller 202. Based on the current and/or voltage sensed by current sensors 204, voltage sensor 212, and arc sensor 214, controller 202 is configured to detect fault conditions and generate control commands.

In operation, controller 202 receives data from sensors 204, 212, and 214 and sends data and control commands to switches SW1-SW5 and/or sensors 204, 212, and 214. Data from sensors 204, 212, and 214 may be converted to digital signals using an ADC, and processed in controller 202. Controller 202 detects a fault condition and generates control commands, based on the data and processed data, thereby controlling the power delivery while providing fault management.

Fault management circuitry 200 is depicted in FIG. 2 as being positioned in receiver-side subsystem 104 as an example for illustration purposes only. Fault management circuitry 200 may be positioned in transmitter-side subsystem 102, receiver-side subsystem 104, or both. When fault management circuitry 200 is positioned in receiver-side subsystem 104, receiver 116 includes fault management circuitry 200. Input 220 is load 120. When fault management circuitry 200 is positioned in transmitter-side subsystem 102, transmitter 114 includes fault management circuitry 200. Output of DC power 124 from transmitter-side power conversion stage 106 is inputted into input 220 and power is transmitted to receiver 116 via line conductor 206.

System 100 may include two fault management circuitries 200, where a first fault management circuitry 200 is positioned in transmitter-side subsystem 102 and a second fault management circuitry 200 is positioned in receiver-side subsystem 104. Communication between controllers 202 is not needed because controller 202 on each side receives data directly from sensors 204, 212, and 214 and sends controls directly to switches SW1-SW5 on that side. In some embodiments, first fault management circuitry 200 or second fault management circuitry 200 does not include a communication circuitry for communication between first and second fault management circuitries 200. Obviation of the need for communication circuitries in controllers 202 is advantageous in reducing costs from the parts, set-up, and installation of communication circuitries and increasing reliability of controllers 202 and fault management circuitries 200 in controlling operation of system 100 by eliminating complications from potential disruption in communication.

Figure 3:
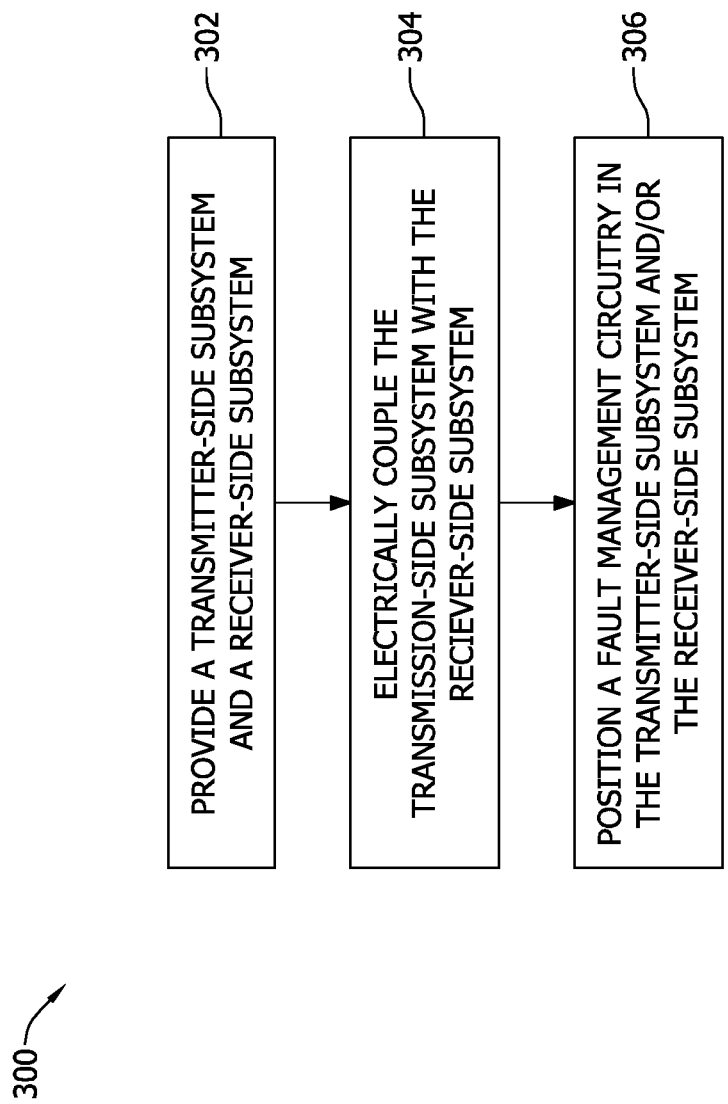
FIG. 3 is a flow chart of an example method for power delivery using the power delivery system shown in FIGS. 1A and 1B and the fault management circuitry shown in FIG. 2.

FIG. 3 is a flow chart of an example method 300 for delivering power over a distance with fault management. In the example embodiment, method 300 includes providing 302 a transmitter-side subsystem and a receiver-side subsystem. Example transmitter-side subsystems and example receiver-side subsystems are transmitter-side subsystem 102 and receiver-side subsystems 104 described herein. Method 300 also includes electrically coupling 304 the transmission-side subsystem with the receiver-side subsystem via a transmission line. Method 300 further includes positioning 306 a fault management circuitry in the transmitter-side subsystem and/or the receiver-side subsystem. Example fault management circuitries are fault management circuitries 200 described herein. Fault conditions are detected and managed by fault management circuitry 200.

In the example embodiment, transmitter 114 delivers power to receiver 116 at a frequency. The power is delivered to receiver 116 at a power delivery portion of the duty cycle. At the end of the power delivery portion of the duty cycle, receiver 116 disconnects load 120 and connects reference resistor 216 between line conductor 206 and neutral conductor 208 during the remaining portion, or the fault-detection portion, of the duty cycle. For example, if the power is at a frequency of 1 kHz, the power delivery portion is the first 98% of the duty cycle, which spans the first (1/1000 Hz)*0.98=4.85 μs. The remaining 2% of the duty cycle, or 150 nanosecond (ns), is the fault-detection portion, where load 120 is disconnected from power supply, and reference resistor 216 is connected between line conductor 206 and neutral conductor 208 by closing switch SW4 and opening switch SW3. The circuitry configuration during the fault management portion is used to measure impedance of system 100, which in turn is used to determine whether a fault condition exists. Fault management circuitry 200 measures line current 224, return current 226, and the transmission voltage via sensors 204 and 212, and detects a fault condition based on the measured currents and voltage.

In the example embodiment, during installation, transmitter 114 and receiver 116 perform a setup procedure, where the line impedance is determined. The line impedance depends on the length and wire gauge of transmission line 126. For example, a transmission line of 14 American Wire Gauge (AWG) of 2 miles (3.2 km) long has an impedance of approximately 30 ohms. For a 16 AWG transmission line of the same length, the impedance is approximately 48 ohms. In one example, system 100 determines the impedance by applying 400 V to transmitter 114 and the reference resistor is connected to power supply by closing switch SW4. Transmitter 114 calculates the impedance based on the voltage across the line and the current flowing in the line. The calculated impedance is the sum of the known resistance of reference resistor 216 plus the line impedance. Therefore, the line impedance is determined.

In the example embodiment, whether a line-to-ground fault exists in system 100 is determined. A line-to-ground fault may also be referred to as a line-to-earth fault or a ground fault. A line-to-earth fault occurs when a conductive object or a person is connected between line conductor 206 and the ground. System 100 measures line current 224 via current sensor 204-A and return current 226 via current sensor 204-B, and compares line current 224 with return current 226. If the difference between line current 224 and return current 226 is above a threshold defined by safety standards, such as Underwriters Laboratories (UL)-1400-1, a line-to-ground fault exits in system 100 and system 100 disconnects line 209 by opening switches SW1 and SW2. Standard UL-1400-1 governs applications having voltage in the range of 450 V or less. If the difference is below the threshold, a line-to-ground fault does not exist in system 100, and power is delivered as normal.

In the example embodiment, whether a line-to-line fault exists is determined. A line-to-line fault occurs when a human body is connected between two lines 209. When a line-to-line fault exists, impedance of system 100 is the impedance of a circuitry where the line impedance and reference resistor 216 are electrically connected in parallel with a human body. The impedance of a human body is approximately between 500 ohms to 13.3 kiloohms. Therefore, the lower end of the impedance of system 100 is when the impedance of the human body is 500 ohms, and is approximately 476.19 ohms when a reference resistor 216 of 10 kiloohms is used, where $$\frac{1}{\frac{1}{10k\Omega}+\frac{1}{500\Omega}} = 476.19\Omega. \quad (1)$$

The upper end of the impedance of system 100 is when the impedance of the human body is 13.3 kiloohms, and is approximately 5.7 kiloohms when a reference resistor 216 of 10 kiloohms is used, where $$\frac{1}{\frac{1}{10k\Omega}+\frac{1}{13.3k\Omega}} = 5.708k\Omega. \quad (2)$$

In the above estimation of the lower and upper ends of impedance of system 100, the line impedance is ignored because reference resistor 216 is selected to have a known resistance much larger than the line impedance. If the measured impedance is in the range between the lower end and the upper end, a line-to-line fault is detected. System 100 disconnects SW1 and SW2 to protect the person from the current.

In the example embodiment, whether a line-to-line resistive fire hazard exists is determined. A line-to-line resistive fire hazard occurs when a conductive object is connected between two lines 209. An impedance of system 100 is measured and compared with a predefined range of impedance stored in controller 202. The predefined range may be determined similarly to that in the detection of a line-to-line fault as described above, except for replacing impedance of a human body with a desired range of resistance. If the impedance is within the predefined range of impedance, a resistive fire hazard condition is detected.

In the example embodiment, whether a series resistive fire hazard exists is determined. When a person or a conductive object of similar impedance is connected between two points of a line conductor 206, a series resistive fire hazard occurs. System 100 measures the impedance during the fault management portion of the duty cycle. If the measured impedance is in the range of impedance corresponding to reference resistor 216, line impedance, and a human body being electrically connected in series, a series resistive fire hazard is detected. For example, if the impedance is in the range between (10 kiloohms+line impedance+500 ohms) and (10 kiloohms+line impedance+13.3 kiloohms) when a reference resistor 216 of 10 kiloohms is used, a series resistive fire hazard is detected.

In the example embodiment, system 100 monitors the current at all times, including the power delivery portion and the fault management portion of the duty cycle, based on the sensed currents 224, 226. At any time when the power exceeds the rated power of system 100 or the current exceeds the rated current of system 100, system 100 disengages, where switches SW1 and SW2 are opened. For example, if the measured current exceeds the rated current corresponding to a rated power of 2 kw of system 100 at a certain operating voltage, an overcurrent condition that the power exceeds the rated power of system 100 is detected and system 100 disengages. Faulty load 120 may cause excess power being drawn from system 100.

Fault management circuitry 200 monitors current at all times and measures impedance during a fault detection portion of a duty cycle. During one duty cycle, fault management circuitry 200 monitors for all fault conditions. As a result, when a fault condition exists, the fault condition lasts one duty cycle or less, largely reducing risks and damage to a person, system 100, and/or load(s) 120.

When a fault condition is detected, power delivery is paused. System 100 is configured to repeat detection of a fault condition. During the repeated detection, a burst of power may be injected into system 100 for the purpose of detecting a fault condition. A period of time may be spaced between neighboring repetitions to provide time for remedy measures. Once a fault condition is corrected or remedied, where the cause of the fault condition is removed, system 100 resumes delivery of power by closing switches SW1 and SW2. Cause of a fault condition may be a person in system 100, a faulty load, and/or or arcs.

Systems and methods described herein are configured to deactivate power transmission in accordance with the predetermined specifications outlined in safety standards such as UL 1400-1 standard. The compliance with standards ensures protection for installers, users, and loads. Systems and methods described herein provide protection against fault conditions triggered by events such as human errors, faulty loads, lightening, strong winds, earthquakes, or unforeseen incidents like falling trees, vehicular collisions, or other types of crashes.

At least one technical effect of the systems and methods described herein includes (a) a power delivery system including fault management that detects a fault condition and disconnects a line upon detection of the fault condition; (b) detecting a fault condition by measuring an impedance with a fault management circuitry having a reference resistor with a known resistance, and (c) fault management circuitries included in the transmitter and receiver of the system without a communication circuitry for communication between the fault management circuitries.

Example embodiments of assemblies and methods for delivering electrical power are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fault-managed power delivery system for delivering power across a distance with fault management, comprising:
    a transmitter-side subsystem configured to receive power from power mains and configured to convert the power to a direct current (DC) power;
    a receiver-side subsystem electrically connected with the transmitter-side subsystem via a transmission line and configured to convert the DC power to an output power and deliver the output power to a load; and
    a fault management circuitry comprising:
        a reference resistor having a known resistance; and
        a controller configured to electrically connect the reference resistor between a line conductor of a line and a neutral conductor and disconnect the load during a fault-detection portion of a duty cycle of power delivered to the receiver-side subsystem, the controller further configured to:
            determine an impedance of the power delivery system during the fault-detection portion;
            determine a fault condition based on the determined impedance and a predefined range of impedance; and
            disconnect the line if the fault condition is detected,
    wherein the fault management circuitry is positioned in the transmitter-side subsystem and/or the receiver-side subsystem.

2. The fault-managed power delivery system of claim 1, wherein the transmitter-side subsystem comprises a first fault management circuitry, the receiver-side subsystem comprises a second fault management circuitry, and a communication circuitry of communication between the first fault management circuitry and the second fault management circuitry is not included in the first fault management circuitry or the second fault management circuitry.

3. The fault-managed power delivery system of claim 1, wherein the fault condition includes a line-to-line fault, and the controller is configured to determine the line-to-line fault based on the determined impedance and the predefined range of impedance corresponding to the reference resistor and a human body being electrically connected in parallel.

4. The fault-managed power delivery system of claim 1, wherein the fault condition includes a line-to-line resistive fire hazard, and the controller is configured to determine the line-to-line resistive fire hazard based on the determined impedance and the predefined range of impedance corresponding to the reference resistor and a conductive object having a range of resistance being electrically connected in parallel.

5. The fault-managed power delivery system of claim 1, wherein the fault condition includes a series resistive fire hazard, and the controller is configured to determine the series resistive fire hazard based on the determined impedance and the predefined range of impedance corresponding to the reference resistor, a line impedance, and a human body being electrically connected in series.

6. The fault-managed power delivery system of claim 5, wherein the controller is configured to determine the line impedance of the transmission line.

7. The fault-managed power delivery system of claim 1, wherein the controller is configured to monitor a current of the output power and disconnect the line when the current exceeds a rated current.

8. The fault-managed power delivery system of claim 1, wherein the fault management circuitry further comprises a line discharge switch electrically connected between the line conductor and the neutral conductor, and the controller is configured to close the line discharge switch when a fault condition is detected.

9. The fault-managed power delivery system of claim 1, wherein the fault management circuitry further comprises an arc sensor configured to detect arcs in a line.

10. The fault-managed power delivery system of claim 1, wherein the controller is configured to determine a line-to-ground fault of a line based on a line current flowing along a line conductor of the line and a return current flowing along a neutral conductor.

11. The fault-managed power delivery system of claim 1, comprising a plurality of channels each configured to transmit an output power corresponding to one of the plurality of channels, wherein the output power of the power delivery system is a sum of the output power of the plurality of channels.

12. A method for delivering power across a distance with fault management, the method comprising:
    providing a transmitter-side subsystem configured to receive power from power mains and configured to convert the power to a direct current (DC) power and a receiver-side subsystem configured to convert the DC power to an output power and deliver the output power to a load;
    electrically connecting the transmitter-side subsystem with the receiver-side subsystem via a transmission line;
    positioning a fault management circuitry in the transmitter-side subsystem and/or the receiver-side subsystem, wherein the fault management circuitry includes:
        a reference resistor having a known resistance;
    during a fault-detection portion of a duty cycle of power delivered to the receiver-side subsystem,
        electrically connecting the reference resistor between a line conductor of a line and a neutral conductor; and
        disconnecting the load;
    determining an impedance during the fault-detection portion;
    determining a fault condition based on the determined impedance and a predefined range of impedance; and
    disconnecting the line if the fault condition is detected.

13. The method of claim 12, wherein the fault condition includes a line-to-line fault, and determining the fault condition further comprises:
    determining the line-to-line fault based on the determined impedance and the predefined range of impedance corresponding to the reference resistor and a human body being electrically connected in parallel.

14. The method of claim 12, wherein the fault condition includes a line-to-line resistive fire hazard, and determining the fault condition further comprises:
    determining the line-to-line resistive fire hazard based on the determined impedance and the predefined range of impedance corresponding to the reference resistor and a conductive object having a range of resistance being electrically connected in parallel.

15. The method of claim 12, wherein the fault condition includes a series resistive fire hazard, and determining the fault condition further comprises:
    determining the series resistive fire hazard based on the determined impedance and the predefined range of impedance corresponding to the reference resistor, a line impedance, and a human body being electrically connected in series.

16. The method of claim 12, wherein determining the fault condition further comprises:
    monitoring a current of the output power; and
    disconnecting the line when the current exceeds a rated current.

17. The method of claim 12, wherein:
    positioning the fault management circuitry further comprises:
        including a line discharge switch in the fault management circuitry by electrically connecting the line discharge switch between the line conductor and the neutral conductor; and
    disconnecting the line further comprises:
        closing the line discharge switch.

18. The method of claim 12, wherein positioning the fault management circuitry further comprises:
    positioning a first fault management circuitry in the transmitter-side subsystem; and
    positioning a second fault management circuitry in the receiver-side subsystem.

19. The method of claim 12, further comprising:
    repeating determining the impedance and determining the fault condition until the fault condition is remedied; and
    resuming delivery of power.

20. A fault management circuitry for managing faults in a power delivery system of delivering power across a distance, the fault management circuitry comprising:
    a reference resistor having a known resistance; and
    a controller configured to electrically connect the reference resistor between a line conductor of a line and a neutral conductor in a power delivery system and disconnect a load during a fault-detection portion of a duty cycle of direct current (DC) power delivered across a distance, the controller further configured to:
        determine an impedance of the power delivery system during the fault-detection portion;
        determine a fault condition based on the determined impedance and a predefined range of impedance; and
        disconnect the line if the fault condition is detected.

* * * * *